United States Patent
Kawatani et al.

(10) Patent No.: US 10,442,145 B2
(45) Date of Patent: Oct. 15, 2019

(54) BOTTLE UNIT FOR PUNCTURE REPAIR

(71) Applicant: SUMITOMO RUBBER INDUSTRIES, LTD., Kobe-shi, Hyogo (JP)

(72) Inventors: Akihiko Kawatani, Kobe (JP); Tsutomu Kono, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 648 days.

(21) Appl. No.: 15/029,486

(22) PCT Filed: Oct. 30, 2014

(86) PCT No.: PCT/JP2014/078919
§ 371 (c)(1),
(2) Date: Apr. 14, 2016

(87) PCT Pub. No.: WO2015/068637
PCT Pub. Date: May 14, 2015

(65) Prior Publication Data
US 2016/0263846 A1  Sep. 15, 2016

(30) Foreign Application Priority Data

Nov. 6, 2013  (JP) ................................. 2013-230486
Dec. 25, 2013  (JP) ................................. 2013-267543

(51) Int. Cl.
*B29C 73/16* (2006.01)
*B29C 73/02* (2006.01)
(Continued)

(52) U.S. Cl.
CPC .......... *B29C 73/166* (2013.01); *B29C 73/025* (2013.01); *B29D 30/0685* (2013.01); *B60C 25/16* (2013.01); *B29L 2030/00* (2013.01)

(58) Field of Classification Search
CPC . B29C 73/166; B29C 73/025; B29D 30/0685; B60C 25/16; B29L 2010/00
(Continued)

(56) References Cited

U.S. PATENT DOCUMENTS 3,069,040 A * 12/1962 Corsette ............. B65D 41/0421
215/318
3,531,013 A *  9/1970 Hammes ............ B65D 43/0208
220/782

(Continued)

FOREIGN PATENT DOCUMENTS

DE    102005019770 A1   11/2006
EP       0949156 A2   10/1999
(Continued)

OTHER PUBLICATIONS

Extended European Search Report for European Application No. 14860740.1, dated Jun. 20, 2017.

*Primary Examiner* — Timothy L Maust
*Assistant Examiner* — James R Hakomaki
(74) *Attorney, Agent, or Firm* — Birch, Stewart, Kolasch & Birch, LLP

(57) ABSTRACT

By the present invention, an inner lid is easily removed by upward thrusting of a sheath tube while detachment of the inner lid during storage is suppressed. An extraction cap is provided with: a cap body provided with a barrel part, a top-end part of which attaches to a mouth of a bottle container, and an air supply tube standing from a bottom portion of the barrel part and forming a first flow channel; and a sheath tube arranged and retained around an exterior of the air supply tube so as to be able to slide up and down. An inner lid is fitted on a top-end part of the air supply tube. An annular first retaining protrusion extending in the circumferential direction is formed on an external peripheral surface of the air supply tube, and a second retaining (Continued)

protrusion retained by the first retaining protrusion and comprising a plurality of retaining protrusions arranged at intervals in the circumferential direction is formed on an internal peripheral surface of the inner lid.

15 Claims, 13 Drawing Sheets

(51) Int. Cl.
  *B29D 30/06* (2006.01)
  *B60C 25/00* (2006.01)
  *B29L 30/00* (2006.01)
(58) Field of Classification Search
  USPC .......................................................... 141/38
  See application file for complete search history.

(56) References Cited

U.S. PATENT DOCUMENTS

| | | | | |
|---|---|---|---|---|
| 3,532,244 A | * | 10/1970 | Yates, Jr. | B65D 43/0212 215/272 |
| 5,553,757 A | * | 9/1996 | Wang | B05B 11/3023 222/321.9 |
| 5,722,554 A | * | 3/1998 | Chanal | B29C 45/16 215/274 |
| 5,762,217 A | * | 6/1998 | Ohmi | B65D 41/485 215/253 |
| D409,490 S | * | 5/1999 | Page | D9/452 |
| 5,921,282 A | * | 7/1999 | Castillo | E03F 5/0407 138/89 |
| 7,568,586 B2 | * | 8/2009 | Walters, Jr. | B65D 41/16 215/295 |
| 2011/0290372 A1 | * | 12/2011 | Dowel | B29C 73/166 141/37 |
| 2012/0000572 A1 | * | 1/2012 | Chou | B29C 73/166 141/38 |
| 2012/0298255 A1 | * | 11/2012 | Nakao | B29C 73/166 141/38 |
| 2014/0190590 A1 | | 7/2014 | Taniguchi et al. | |
| 2014/0209208 A1 | | 7/2014 | Taniguchi et al. | |
| 2014/0224380 A1 | * | 8/2014 | Kono | B29C 73/166 141/37 |
| 2014/0261869 A1 | | 9/2014 | Sekiguchi | |

FOREIGN PATENT DOCUMENTS

| | | | |
|---|---|---|---|
| EP | 2527131 A1 | 11/2012 | |
| JP | 2008-155929 A | 7/2008 | |
| JP | WO 2009154087 A1 * | 12/2009 | .......... B29C 73/166 |
| JP | 2011-131547 A | 7/2011 | |
| JP | 2012-232487 A | 11/2012 | |
| JP | 2013-67012 A | 4/2013 | |
| JP | 2013-067013 A | 4/2013 | |
| WO | WO 2013/054679 A1 | 4/2013 | |

* cited by examiner

BOTTLE UNIT FOR PUNCTURE REPAIR

TECHNICAL FIELD

The present invention relates to a bottle unit for puncture repair to repair a punctured tire emergency by injecting a puncture repair liquid and compressed air sequentially thereto.

BACKGROUND ART

For example, the following patent document 1 discloses a bottle unit for puncture repair (c) including a bottle container (a) and an extraction cap (b) attached to the mouth portion of the bottle container, as illustrated in FIG. 12.

The extraction cap (b) includes a coupling means (e), a first flow channel (f), a second flow channel (f2), a first closing means (g1), and a second closing means (g2). The coupling means (e) can couple the extraction cap (b) and a compressor (d). The first flow channel (f1) can take in a compressed air into the bottle container (a) from the compressor (d). The second flow channel (f2) can extract a puncture repair liquid and the compressed air sequentially from the bottle container (a) by an intake compressed air. The first and second closing means (g1) and (g2) close the first and second flow channels (f1) and (f2) respectively in a pre-coupling state.

The first flow channel (f1) is formed as a central bore (h1) of a blast pipe (h) whose lower end is connectable to the compressor (d). A sheath pipe (i) is supported by the blast pipe (h) slidably in a vertical direction. The first closing means (g1) is configured to an inner lid (j) attached to an upper end of the blast pipe (h).

When the extraction cap (b) is coupled to the compressor (d), the sheath pipe (i) is pushed up by the compressor (d) where the lower end of the sheath pipe (i) comes into contact with the compressor (d). At this time, as illustrated in FIGS. 13A and 13B, the inner lid (j) is also pushed up by the sheath pipe (i), and then a locking projection (ja) of the inner lid (j) gets over a locking projection (ha) of the blast pipe (h). Thus, the inner lid (j) comes off from the blast pipe (h) to open the first flow channel (f1).

In the inner lid (j), however, the locking projection (ja) has an annular shape continuously in a circumferential direction, and the inner lid (j) is pushed up horizontally by the sheath pipe (i). Thus, it is necessary to be greatly deformed the inner lid (j) as a whole in order that the locking projection (ja) gets over the locking projection (ha). That is, a large pushing force to remove the inner lid (j) is necessary and the operability deteriorates when coupling. In particular, since the inner lid (j) will harden due to a low temperature when a puncture is repaired in a condition below the freezing point or a very low-temperature condition equal to or less than minus 30 degrees C., there will be arisen another problem that the inner lid (j) is not removed.

When lowering the heights (ja) and (ha) of the locking projections in order to help getting over them, the inner lid (j) may be removed due to vibration during storage and it may lead a risk of leaking out of the puncture repair liquid.

CITATION LIST

Patent Literature

Patent document 1: Japanese Unexamined Patent Application publication No. 2013-67013

SUMMARY OF INVENTION

Technical Problem

The present invention has an object to provide a bottle unit for puncture repair kit capable of removing the inner lid easily by a push-up action of the sheath pipe, while preventing the inner lid being removed during storage.

Solution to Problem

The first invention provides a bottle unit for puncture repair including a bottle container containing a puncture repair liquid, and an extraction cap being attached to a mouth portion of the bottle container, the extraction cap including a coupling means for coupling the extraction cap and a compressor to be secured to each other, a first flow channel for taking in a compressed air from the compressor into the bottle container, a second flow channel for extracting the puncture repair liquid and the compressed air sequentially from the bottle container by an intake compressed air, and a first closing means and a second closing means for respectively closing the first flow channel and the second flow channel in a pre-coupling state by attained the coupling means. The extraction cap further includes a cap main body and a sheath pipe. The cap main body includes a barrel portion including an upper end connected to the mouth portion of the bottle container, a lower end closed by a bottom, a tubular portion between the upper end and the lower end having an inner hole communicated with an inside of the bottle container, and a blast pipe extending upwardly from the bottom concentrically with the tubular portion and including a central bore to form the first flow channel. The sheath pipe is held by the blast pipe vertically in slidable manner, wherein the sheath pipe is pushed up upon connection of the coupling means. The first closing means includes an inner lid detachably attached to an upper end of the blast pipe to close the first flow channel so that the inner lid is detached from the blast pipe to open the first flow channel when the inner lid is pushed up by the sheath pipe. The blast pipe includes a first locking projection configured to an annular projection that protrudes in a small height from an outer surface of the blast pipe and extends continuously in a circumferential direction. The inner lid includes a second locking projection that protrudes in a small height from an inner surface of the inner lid and engages with the first locking projection, wherein the second locking projection includes a plurality of locking-projections arranged in the circumferential direction apart from one another.

The second invention provides a bottle unit for puncture repair including a bottle container containing a puncture repair liquid, and an extraction cap being attached to a mouth portion of the bottle container. The extraction cap includes a coupling means for coupling the extraction cap and a compressor to be secured to each other, a first flow channel for taking in a compressed air from the compressor into the bottle container, a second flow channel for extracting the puncture repair liquid and the compressed air sequentially from the bottle container by an intake compressed air, and a first closing means and a second closing means for respectively closing the first flow channel and the second flow channel in a pre-coupling state by attained the coupling means. The extraction cap further includes a cap main body and a sheath pipe. The cap main body including a barrel portion including an upper end connected to the mouth portion of the bottle container, a lower end closed by a bottom, a tubular portion between the upper end and the lower end having an inner hole communicated with an inside of the bottle container, and a blast pipe extending upwardly from the bottom concentrically with the tubular portion and including a central bore to form the first flow channel. The sheath pipe is held by the blast pipe vertically in slidable manner, wherein the sheath pipe is pushed up upon connection of the coupling means. The first closing means includes an inner lid detachably attached to an upper end of the blast pipe to close the first flow channel so that the inner lid is detached from the blast pipe to open the first flow channel when the inner lid is pushed up by the sheath pipe. The blast pipe includes a first locking projection configured to an annular projection that protrudes in a small height from an outer surface of the blast pipe and extends continuously in a circumferential direction. The sheath pipe includes a push-up projection on the upper end surface.

Advantageous Effects of Invention

In the first invention, the first locking projection provided on the blast pipe is formed as an annular protrusion extending continuously in the circumferential direction. In contrast, the second locking projection provided on the inner lid is formed as a plurality of locking projections which are arranged at a distance in the circumferential direction apart from one another.

As a result, it is possible to remove the inner lid easily. Specifically, the second locking projection is divided into a plurality of locking projections. Thus, it is not necessary to be deformed the inner lid as a whole greatly and evenly in a radial direction as the conventional art. Accordingly, it is possible to remove the inner lid by a partial deformation in which each of the locking projections can get over the first locking projection. Furthermore, since the thickness of the inner lid between a pair of circumferentially adjacent locking projections become thinner, the partial deformation above may be easily provided.

Through these effects, it is possible to remove the inner lid easily with less push-up force, while preventing the inner lid from being removed during storage.

In the second invention, the upper end of the sheath pipe is provided with a push-up projection projecting in a step like manner. Thus, the effect similar to that a lid is taken off from a bottle by a bottle opener is obtained, for example. Specifically, the contact area between the sheath pipe and the inner lid, at the time of a push-up action by the push-up projections, is reduced. When the push-up force is the same, since the push-up pressure acting on the inner lid may be increased according to reduction of the contact area, it is possible to deform a part of the inner lid. Furthermore, it is possible to remove the inner lid by the deformation of only a part of the inner lid.

Through these effects, it is possible to remove the inner lid easily with less push-up force, while preventing the inner lid from being removed during storage.

DESCRIPTION OF EMBODIMENTS

Figure 1:
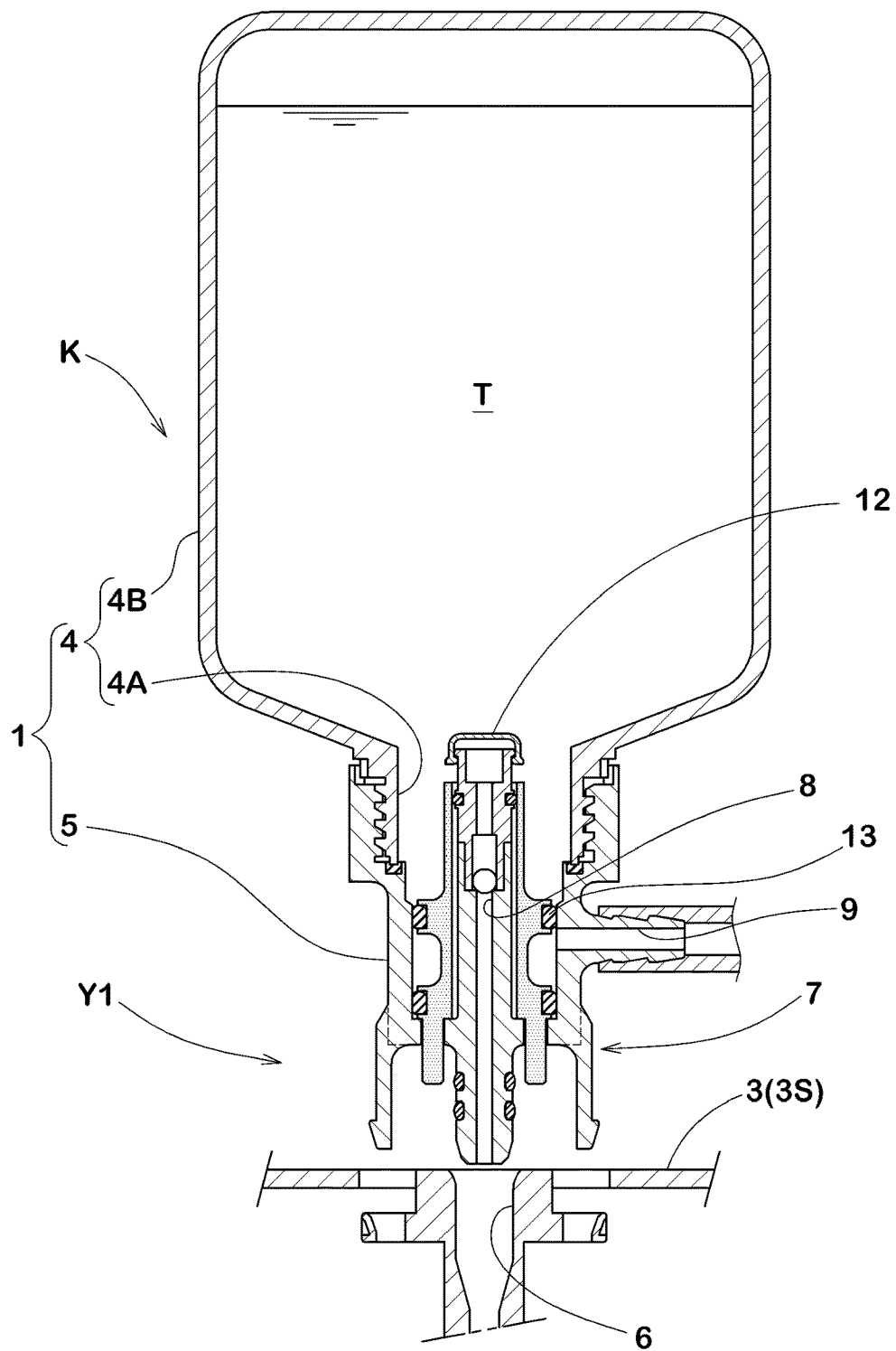
FIG. 1 is a cross-sectional view illustrating a bottle unit under a pre-coupling state in accordance with the first invention.

Hereinafter, embodiments of the present invention will be described in detail. FIG. 1 illustrates a cross-sectional view of a puncture repair kit (K) using a bottle unit 1 of an embodiment in accordance with the first invention. The puncture repair kit (K) includes the bottle unit 1 and a compressor 3. FIG. 1 illustrates a pre-coupling state Y1 of the bottle unit 1 and the compressor 3.

The compressor 3 includes a well known movable portion including a motor, a piston and a cylinder, for example. In this present embodiment, a compressed air discharge port 6 for discharging the compressed air is formed on an upper surface 3S of the compressor 3.

The bottle unit 1 includes a bottle container 4 and an extraction cap 5 attached to a mouth portion 4A of the bottle container 4. The bottle container 4 includes a container portion 4B containing a puncture repair liquid T and the mouth portion 4A having a small-diameter cylindrical shape and protruding from a lower end of the container portion.

The extraction cap 5 includes a coupler (coupling means) 7, a first flow channel 8, a second flow channel 9, a first closure (closing means) 12 and a second closure (closing means) 13. The coupling means 7 can couple the extraction cap 5 and the compressor 3. The first flow channel 8 can take in a compressed air from the compressor 3 into the bottle container. The second flow channel 9 can extract the puncture repair liquid T and the compressed air sequentially from the bottle container 4 by an intake compressed air. The first and second closing means 12 and 13 can close the first flow channel 8 and the second flow channel 9 respectively in the pre-coupling state Y1.

Figure 2:
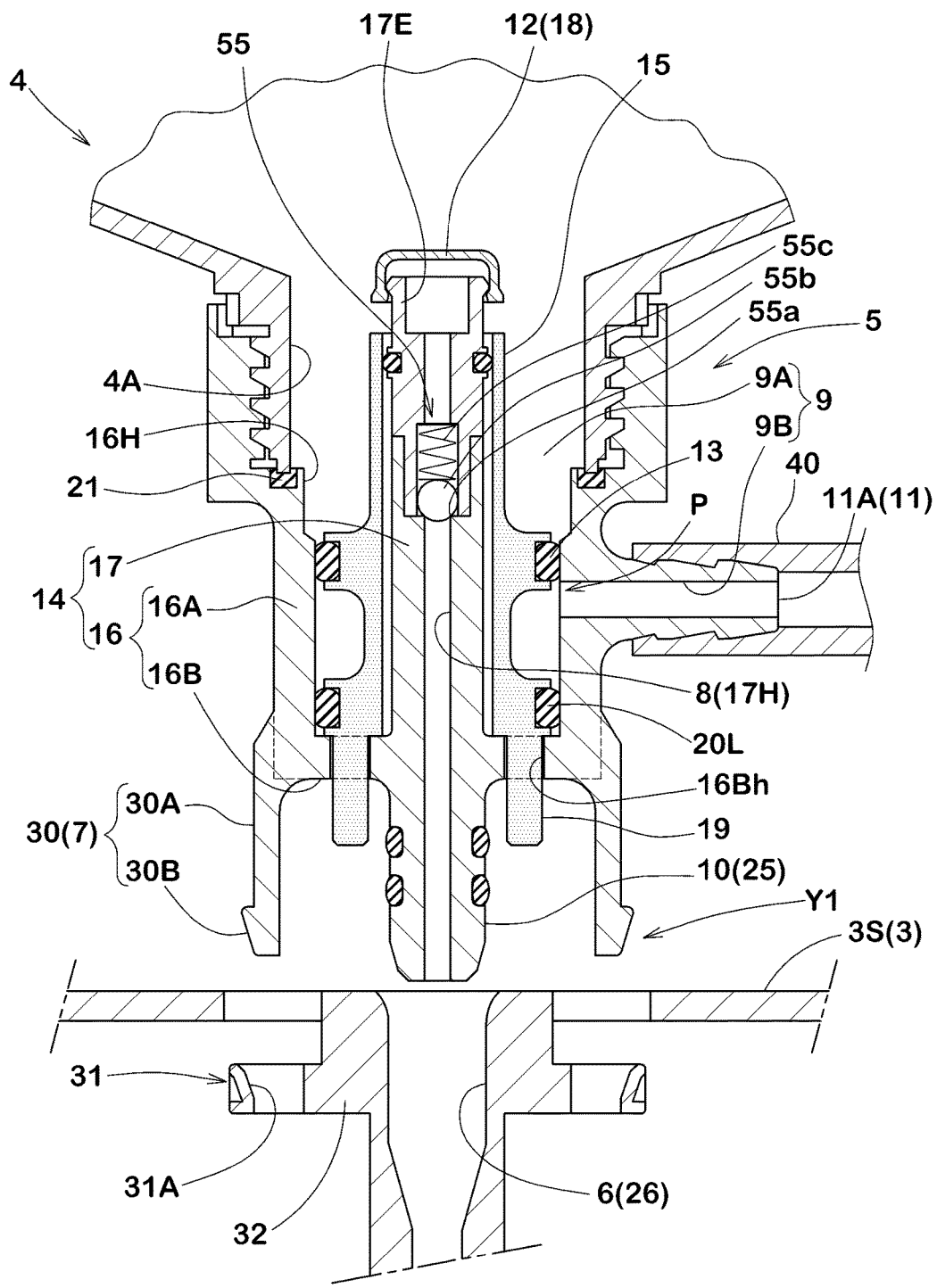
FIG. 2 is a partial enlarged cross-sectional view illustrating a main portion of the bottle unit in accordance with the first invention.

As illustrated in FIG. 2, the extraction cap 5 is configured to include a cap main body 14 and a sheath pipe 15. The cap main body 14 includes a barrel portion 16 and a blast pipe 17. The barrel portion 16 includes a tubular portion 16A having an upper end connected to the mouth portion 4A of the bottle container 4 through a seal member 21 and a lower end closed by a bottom 16B of the tubular portion 16A. The blast pipe 17 extends upwardly from the bottom. The tubular portion 16A includes an inner hole 16H communicated with an inside of the bottle container 4.

Figure 6A:
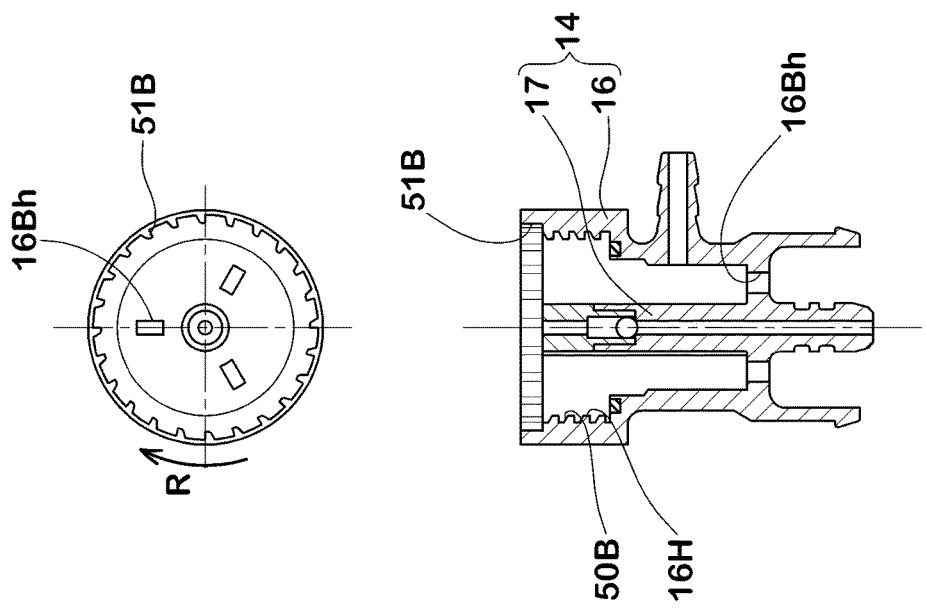
FIG. 6A is a cross-sectional view and a bottom view of the bottle container.
Figure 6B:
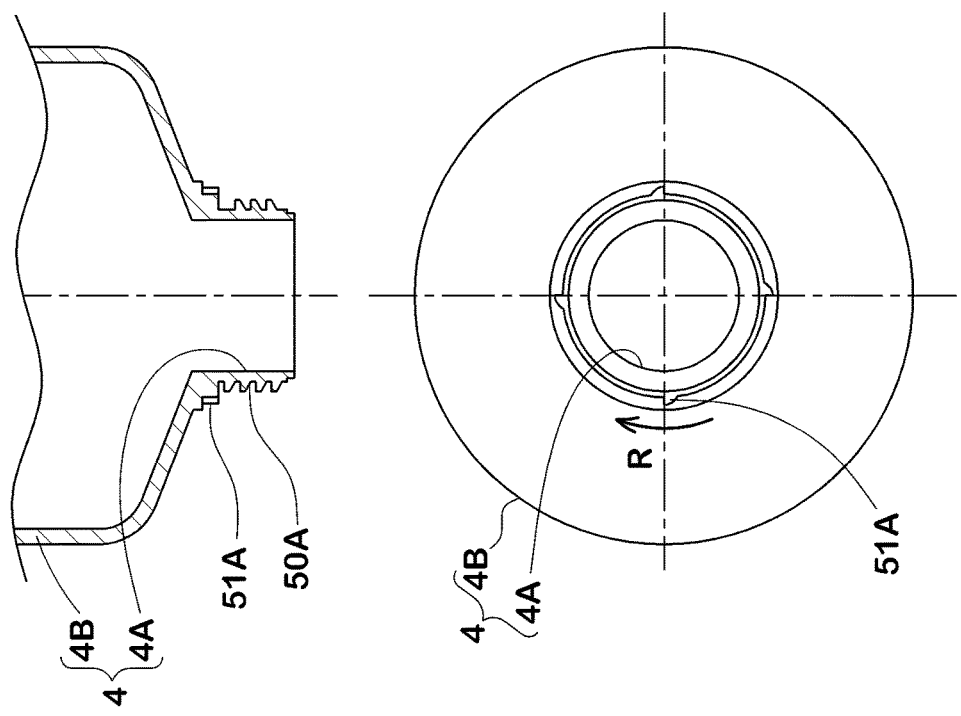
FIG. 6B is a top view and a cross-sectional view of the barrel portion.

In this embodiment, the mouth portion 4A is screwed into the inner hole 16H of the tubular portion 16A, for example. Specifically, as illustrated in FIGS. 6A and 6B, a male screw portion 50A is formed on an outer surface of the mouth portion 4A of the bottle container 4, and a female screw portion 50B which is engageable with the male screw portion 50A is formed on an upper inner surface of the inner hole 16H of the cap main body 14. Furthermore, in this embodiment, a locking means 51 having a ratchet mechanism is provided to prevent leaking out of the puncture repair liquid T due to loosening of the screws by vibration during storage.

Figure 7:
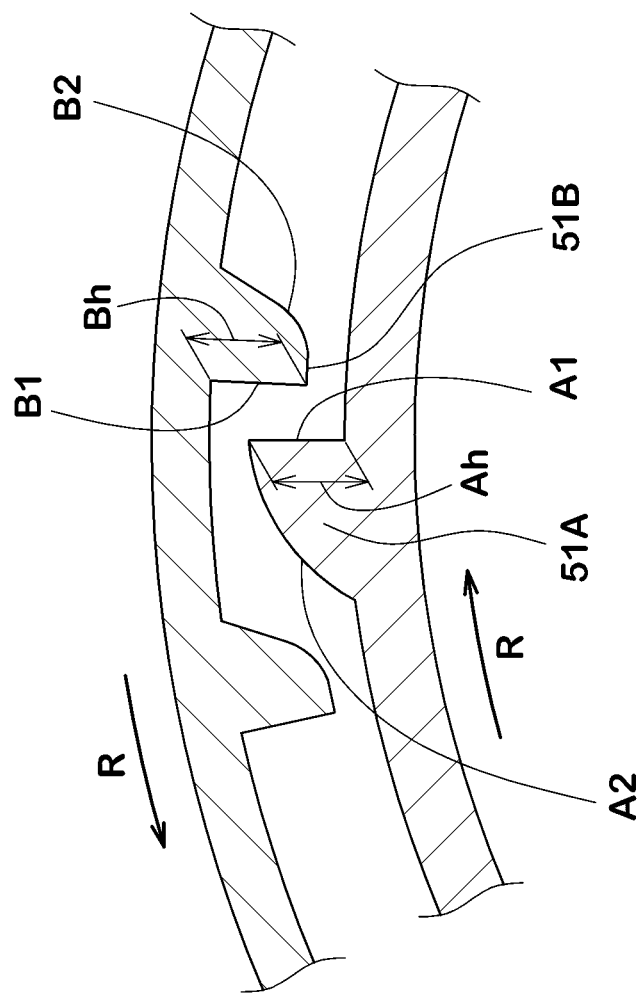
FIG. 7 is an enlarged cross-sectional view of first and second ratchet teeth.

The locking means 51 in accordance with the present embodiment includes a first ratchet tooth 51A provided on the outer surface of the mouth portion 4A at an upper side of the male screw portion 50A, and a second ratchet tooth 51B provided on an inner surface of the inner hole 16H at an upper side of the female screw portion 50B. As illustrated in FIG. 7, the first ratchet tooth 51A and the second ratchet tooth 51B include radially extending locking surfaces A1 and B1 respectively on their circumferential ends in an anti-screwed rotational direction R to engage with each other. Thus, the first ratchet tooth 51A and the second ratchet tooth 51B can be engaged with one another in the anti-screwed rotational direction R to prevent loosening. On the other hand, climbable surfaces A2 and B2, e.g. a smooth slope or arc-shaped surface, are provided on the circumferential ends of the respective teeth in the screwed rotational direction where the ratchet teeth can get over with one another to turn. When the heights Ah and Bh of the first and second ratchet teeth 51A and 51B respectively are excessively small, locking may be insufficient. On the other hand, when the heights are excessively large, a large force is necessary to get over teeth and operability tends to be worse. Thus, the heights Ah and Bb are preferably in a range of from 1 to 10 mm.

As illustrated in FIG. 2, the blast pipe 17 extends upwardly from the bottom 16B concentric with the tubular portion 16A, and has a central bore 17H forming the first flow channel 8.

In this embodiment, the upper end of the blast pipe 17 is located downward of a liquid surface of the puncture repair liquid T, and the first flow channel 8 is provided with a one-way valve 55 to prevent back-flow of the puncture repair liquid T from the bottle container 4. The one-way valve 55 is configured to include a step-like valve seat 55a formed in the first flow channel 8, a ball valve 55b for opening and closing the valve seat portion 55a, and a spring for pressing the ball valve 55b to the valve seat portion 55a.

Furthermore, the barrel portion 16 includes an air inlet portion 10 communicating with the first flow channel 8. The air inlet portion 10, in this embodiment, is directly connected to the compressed air discharge port 6 of the compressor 3 without passing through a horse or the like. Specifically, the one of the compressed air discharge port 6 and the air inlet portion 10 is formed as a connection nozzle 25 protruding toward the other, and the other is formed as a nozzle receiver 26 for coupling the connection nozzle 25. In this embodiment, the air inlet portion 10 is formed as the connection nozzle 25 protruding downward from the bottom 16B, and the compressed air discharge port 6 is formed as the nozzle receiver 26, for example.

The coupling means 7 can fix the bottle unit 1 on the compressor 3 integrally at the puncture repair site when repairing puncture, thereby preventing the fall down of the bottle unit 1 during puncture repair work. The coupling means 7 according to the embodiment includes a plurality of, for example of two or three locking claws 30 extending downward from the bottom 16B. The locking claws 30 includes a main portion 30A connected to the bottom 16B and an approximately right triangular shaped hook portion 30B provided on a lower end of the main portion 30A so as to protrude outwardly. An engaging portion 31 for fitting the coupling means 7 is provided on the side of the compressor 3. The engaging portion 31 according to the present embodiment includes an engaging hole 31A for engaging with and retaining the hook portion 30B. The engaging hole 31A according to the present embodiment is formed on a frame 32 formed with the nozzle receiver 26 integrally.

Next, the sheath pipe 15 is held by the blast pipe 17 vertically in slidable manner. The sheath pipe 15 is formed with a push-up lever 19 that pushes up the sheath pipe 15 upwardly upon connection of the coupling means 7. The push-up lever 19 includes a plurality of, for example two or three projecting pieces protruding from the lower end of the sheath pipe 15 passing through the bottom 16B. Note that the bottom 16B is formed a through hole 16Bh through which the push-up lever 19 passes. In this embodiment, the pushing-up lever 19 can come into contact with the upper surface 3S of the compressor 3, and then pushes up the sheath pipe 15 upwardly upon connection of the coupling means 7.

The sheath pipe 15 is integrally provided with the second closing means 13 to close the second flow channel 9. The first closing means 12 is provided on the upper end 17E of the blast pipe 17 to close the first flow channel 8. The first and second closing means 12 and 13 are operated by a push-up action of the sheath pipe 15 so as to open the first and second flow channels 8 and 9, respectively.

The second flow channel 9 includes an annular vertical passage 9A formed by a gap between the sheath pipe 15 and the tubular portion 16 and a lateral passage 9B communicated with the vertical passage 9A at an intersection point P and extending from the intersection point P to a distal opening 11A of an outlet port 11. The outlet port 11 protrudes radially outwardly from the tubular portion 16A as a coupling portion for a hose 40 for injecting the puncture repair liquid T and a compressed air to the tire. The hose 40 is stored by winding around the tubular portion 16A, for example.

Figure 3:
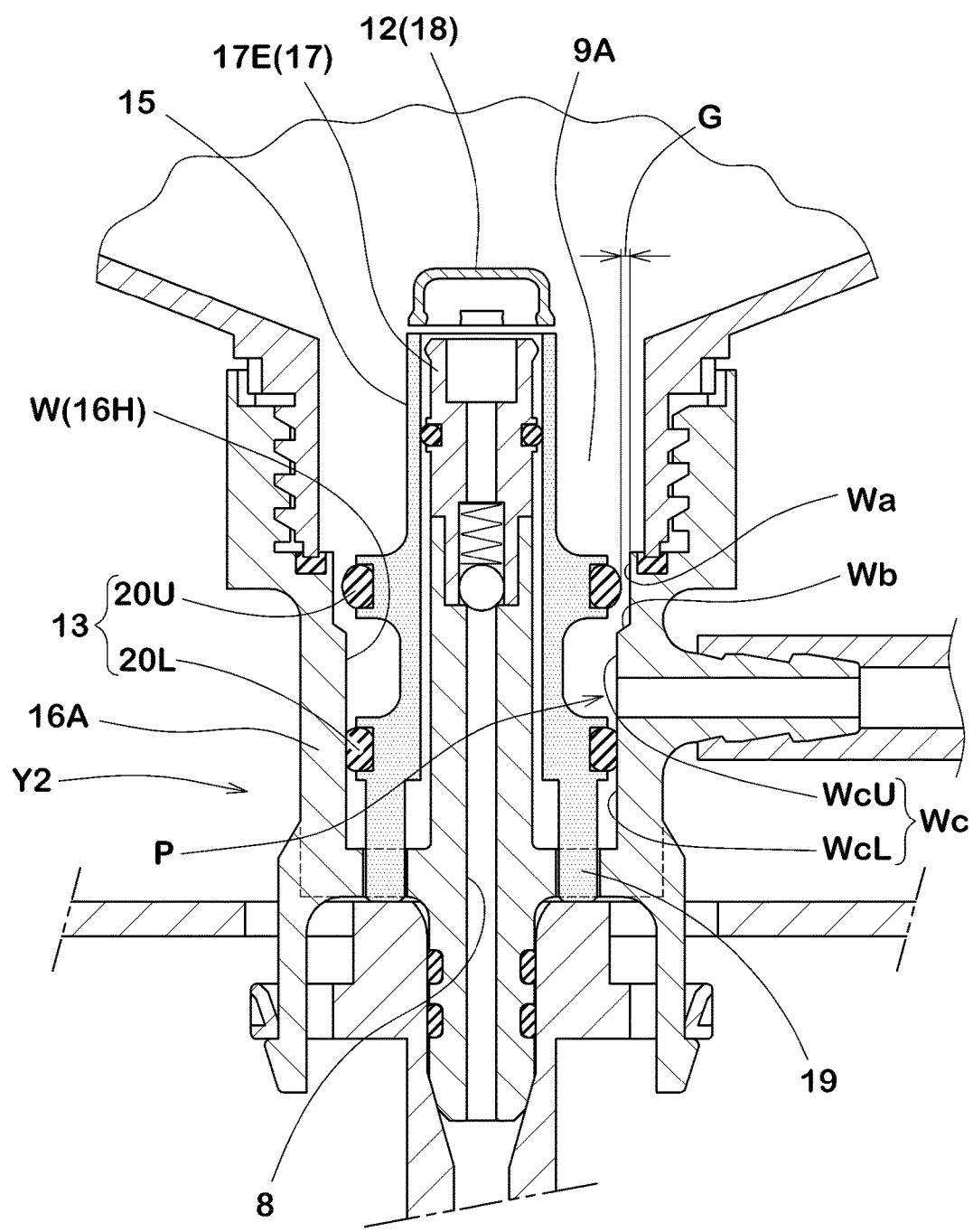
FIG. 3 is a partial cross-sectional view illustrating a coupling state between the bottle unit and a compressor.

As illustrated in FIG. 3, the inner wall W of the tubular portion 16A includes a large-diameter wall portion Wa where the inner hole 16H forms a large diameter and a small-diameter wall portion We continuing the large diameter wall portion Wa on the lower side via a step portion Wb. The step portion Wb is formed upward of the intersection point P. Thus, the small diameter wall portion We is further divided into an upper small-diameter wall portion WcU between the step portion Wb and the intersection point P, and a lower small-diameter wall portion WcL located lower than the intersection point P.

The second closing means 13 according to the present embodiment includes an upper seal member 20U and a lower seal member 20L which are attached to the sheath pipe 15 and move together with the sheath pipe 15. The seal members 20U and 20L are a so-called O-ring held by a circumferential grooves formed on the outer periphery of the sheath pipe 15. In the second closing means 13, the upper seal member 20U is in contact with the upper small-diameter wall portion WcU so as to close the second flow channel 9 in the pre-coupling state Y1, as illustrated in FIG. 2. Thus, it can prevent that the puncture repair liquid T leaks out toward the outlet port 11. Furthermore, in a coupling state Y2, the upper seal member 20U can move upwardly beyond the step portion Wb by the pushed up action of the sheath pipe 15 caused by the push-up lever 19, as illustrated in FIG. 3. At that time, a gap G is made between the upper seal member 20U and the large-diameter wall portion Wa so that the second flow channel 9 is opened.

The first closing means 12 is configured as an inner lid 18 that is fitted on the upper end 17E of the blast pipe 17. When the inner lid 18 is pushed up by the sheath pipe 15, it is detached from the upper end 17E so as to open the first flow channel 8.

Figure 5A:
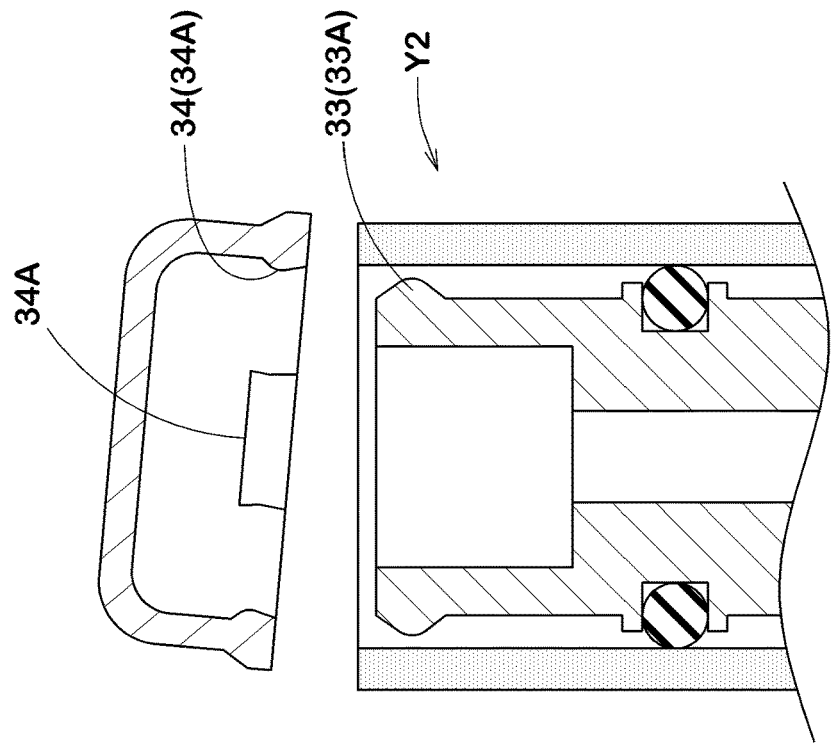
FIGS. 5A and 5B are partial cross-sectional views illustrating a process where the inner lid is being removed from the blast pipe by a sheath pipe.
Figure 5B:
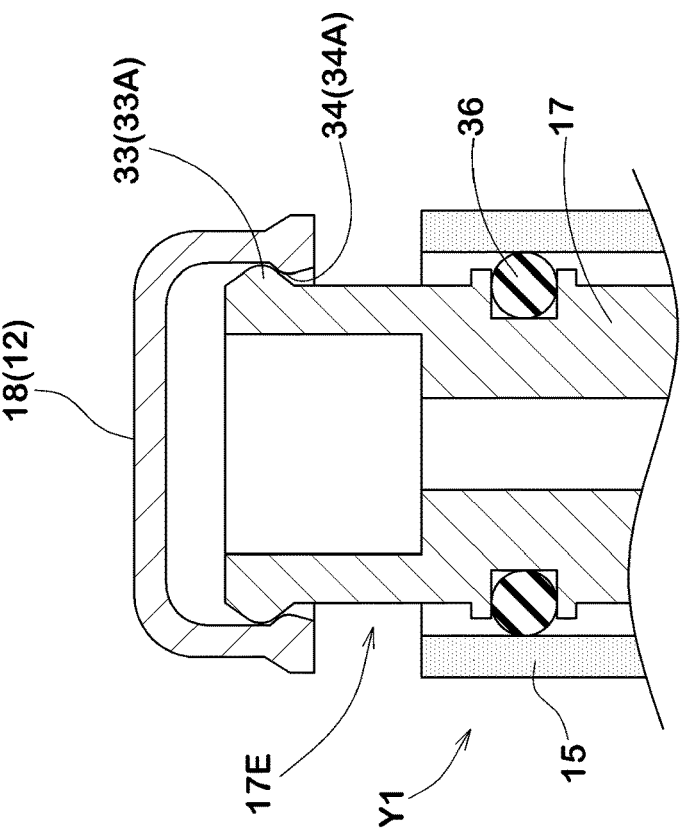

As illustrated in FIGS. 5A and 5B, the upper end 17E of the blast pipe 17 is provided with a first locking projection 33 that protrudes in a small height from an outer surface of the blast pipe 17. Furthermore, the inner lid 18 is provided with a second locking projection 34 that protrudes in a small height from an inner surface of the inner lid 18 and can engage with the first locking projection 33.

Figure 4A:
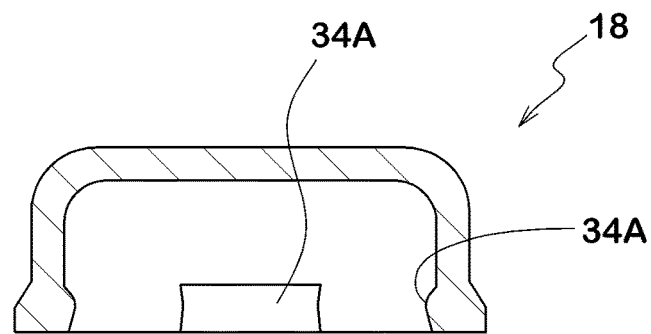
FIGS. 4A and 4B are a cross-sectional view and a bottom view illustrating an inner lid, respectively.
Figure 4B:
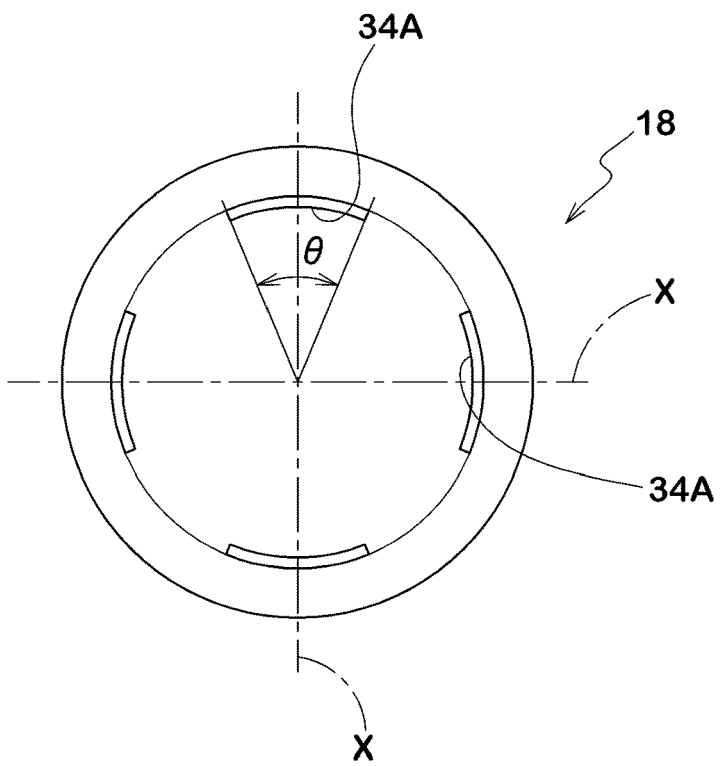

The first locking projection 33 is formed as an annular projection 33A extending continuously in the circumferential direction. On the other hand, the second locking projection 34 is formed as a plurality of locking projections 34A which is arranged in the circumferential direction apart from one another. As illustrated in FIGS. 4A and 4B, preferably, the number of the locking projections 34A is an even number (e.g. 2, 4, etc.), and a pair of locking-protrusions 34A are arranged so as to face with each other on a radial line X of the inner lid 18. Thus, stabilization of engagement is achieved, and it can suppress that the engagement is released due to vibration or the like. For the same purpose, a circumferential width of the respective locking projections 34A which corresponds to a central angle θ around the center point of the inner lid 18 is preferably of from 5 to 45 degrees.

Although the present embodiment exemplifies an approximately V-shape for the cross sectional shape for the annular projection 33A and locking projections 34A, various cross-sectional shapes such as a semi-circular shape or the like may alternatively be employed. In the pre-coupling state Y1, the upper end of the sheath pipe 15 is located downward of the inner lid 18. Furthermore, a seal ring 36 such as O-ring is attached to the blast pipe 17 to seal a gap between the sheath pipe 15 and the blast pipe 17. In the pre-coupling state Y1, the second locking projection 34 engages with the first locking projection 33. When the sheath pipe 15 is pushed up, the inner lid 18 elastically deforms such that the second locking projection 34 gets over the first locking projection 33, and then the inner lid 18 is detached.

As described above, the second locking projection 34 is divided into a plurality of locking projections 34A. Thus, it is not necessary to be deformed the inner lid 18 as a whole greatly and evenly in the radial direction. Accordingly, it is possible to remove the inner lid 18 by a partial deformation in which each of the locking projections 34A can get over the first locking projection 33. Furthermore, since the thickness of the inner lid 18 between a pair of circumferentially adjacent locking projections 34A and 34A becomes thinner, the partial deformation above may be easily provided. Through these effects, it is possible to remove the inner lid 18 easily with less push-up force, while preventing the inner lid 18 from being removed during storage.

When the central angle θ is less than 5 degrees, the locking projections 34A may easily come off due to its low locking force. Conversely, when the angle is more than 45 degrees, it may be difficult to detach.

Figure 8:
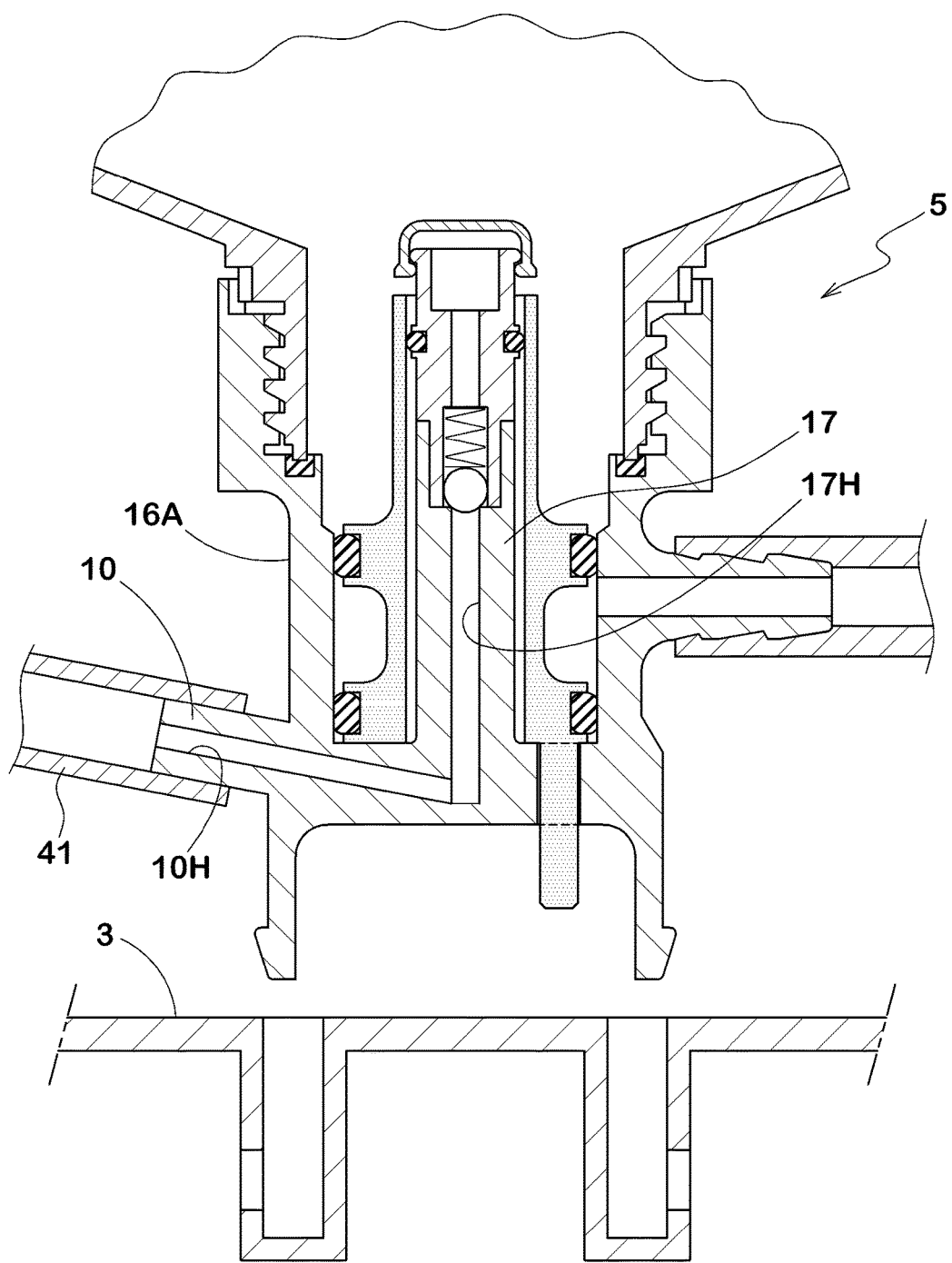
FIG. 8 is a cross-sectional view illustrating an extraction cap in accordance with another embodiment.

FIG. 8 illustrates the extraction cap 5 in accordance with another embodiment. In the extraction cap 5 in accordance with the present embodiment, the air inlet portion 10 is connected to the compressed air discharge port 6 (not illustrated) through a hose 41. That is, it does not provide a direct connection. Specifically, the air inlet portion 10 in this embodiment is configured as a coupling portion that protrudes radially outward from the tubular portion 16A to which one end of the hose 41 having the other end to be connected to the compressor 3 is connectable. The inner bore 10H of the air inlet portion 10 is communicated with the central bore 17H of the blast pipe 17. In the extraction cap 5 of the present embodiment, the compressor 3 may be used for not only repairing puncture but inflating an air matt, bladder and the like.

Figure 9:
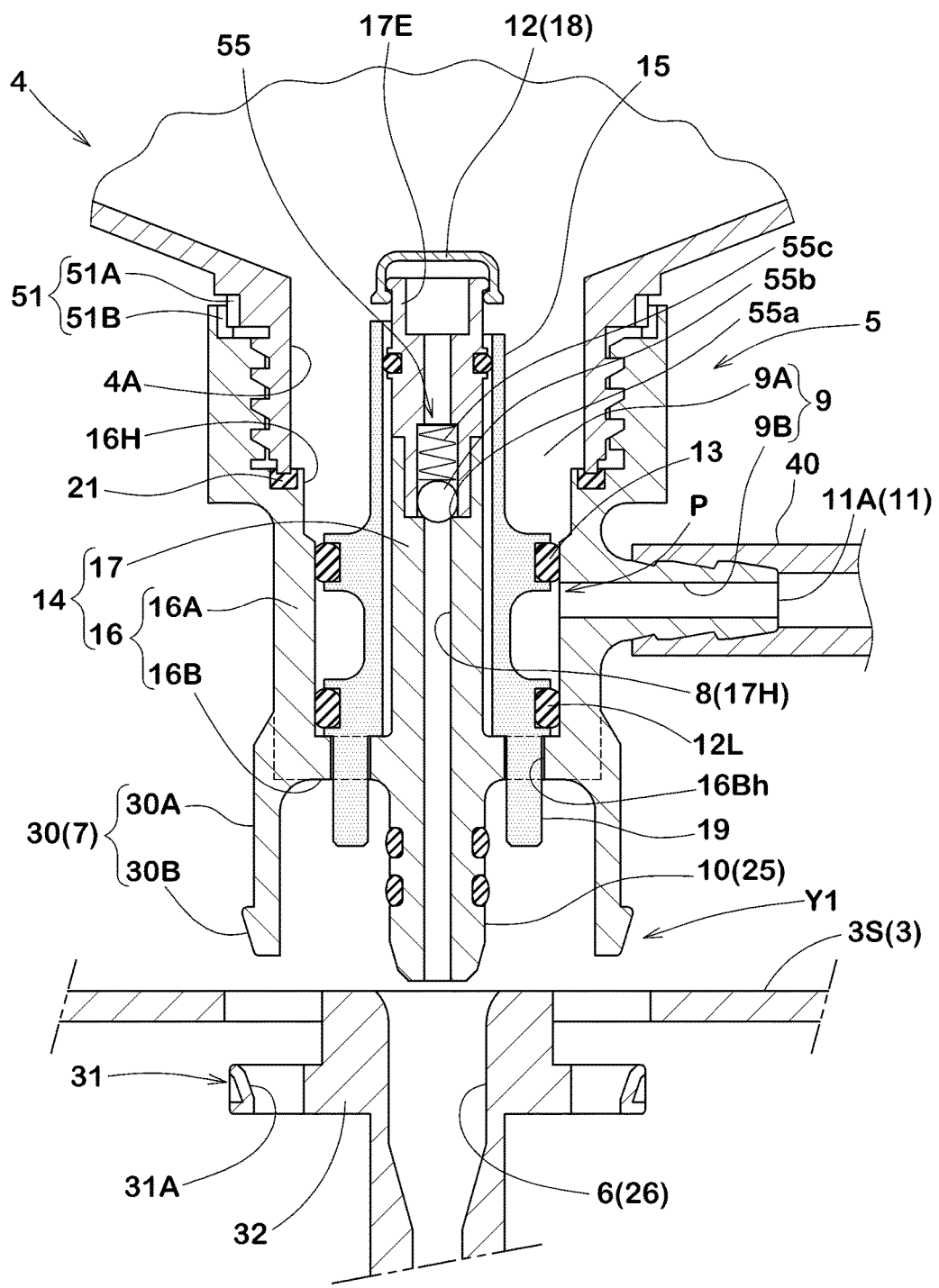
FIG. 9 is a cross-sectional view illustrating a major part of the bottle unit in accordance with the second invention.

FIG. 9 illustrates a cross-sectional view of a major part of the bottle unit 1 in accordance with the second invention. The bottle unit 1 according to the second invention is different from the bottle unit 1 according to the first invention in the sheath pipe 15.

Figure 10A:
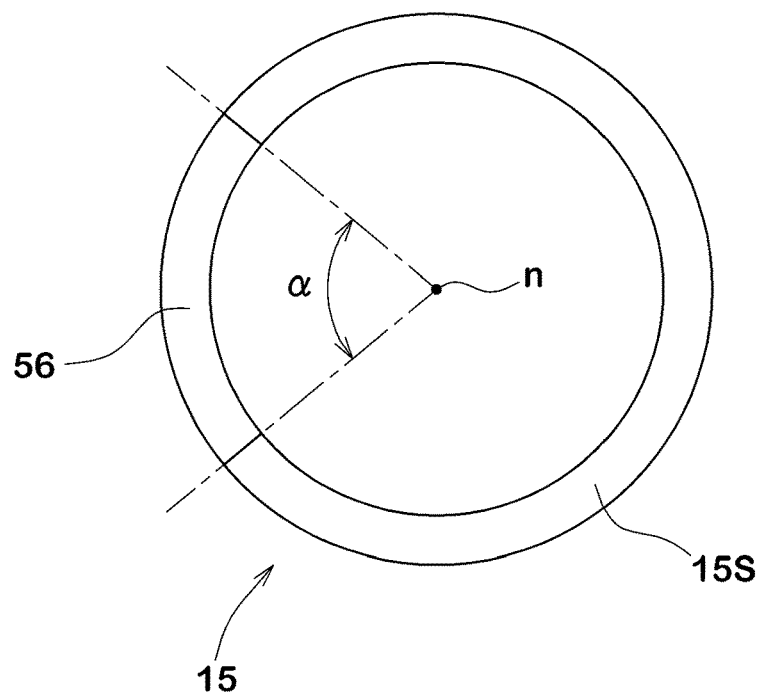
FIGS. 10A and 10B are a plan view and a cross-sectional view illustrating an upper end of the sheath pipe.
Figure 10B:
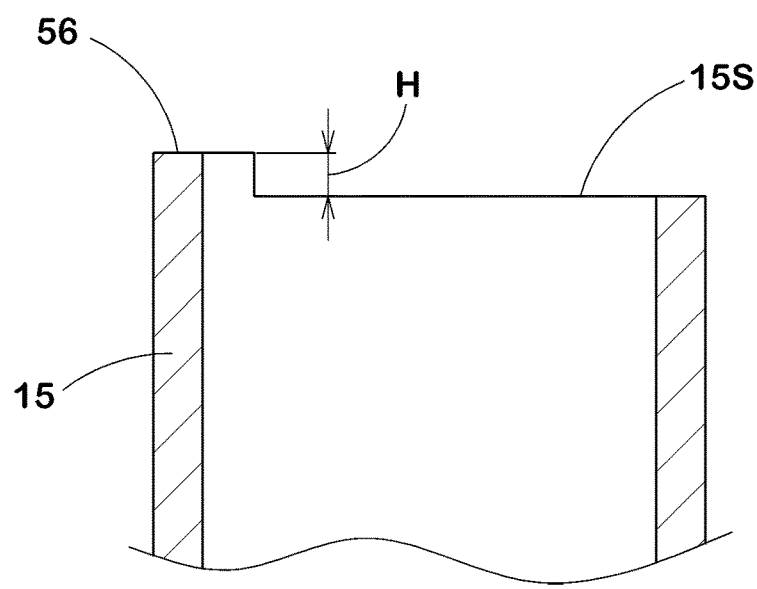

Specifically, in the second invention, as illustrated in FIGS. 10A and 10B, the upper end surface 15S of the sheath pipe 15 is provided with a push-up projection 56 in a step shape in this embodiment. Preferably, the push-up projection 56 is formed in a central angle α equal to or less than 90 degrees around the center point n of the sheath pipe 15.

Figure 11A:
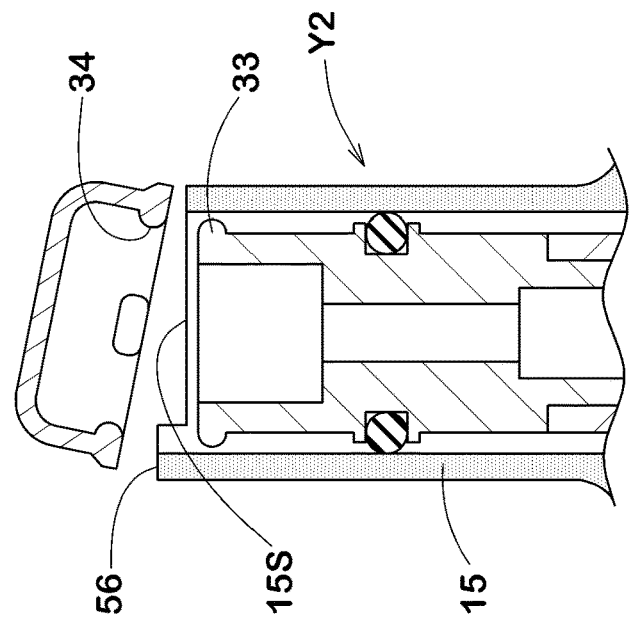
FIGS. 11A and 11B are partial cross-sectional views illustrating a process where the inner lid is being removed from the blast pipe by the sheath pipe.
Figure 11B:
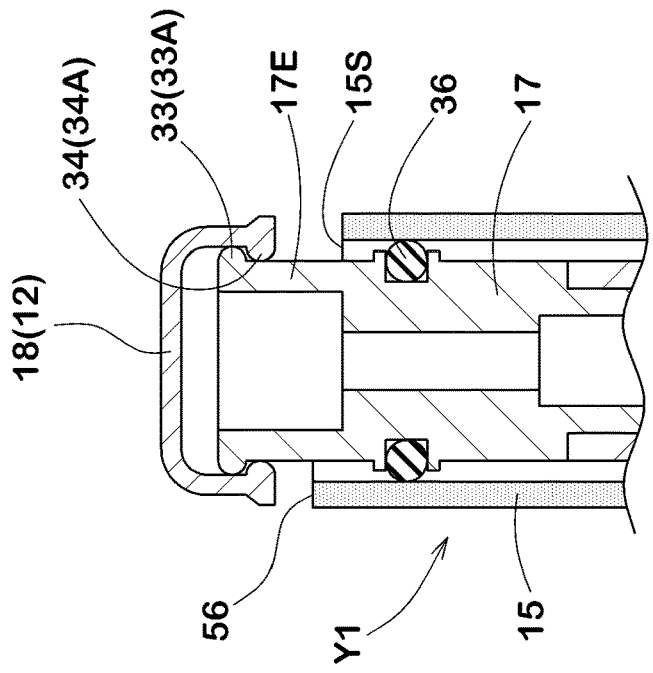
Figure 12:
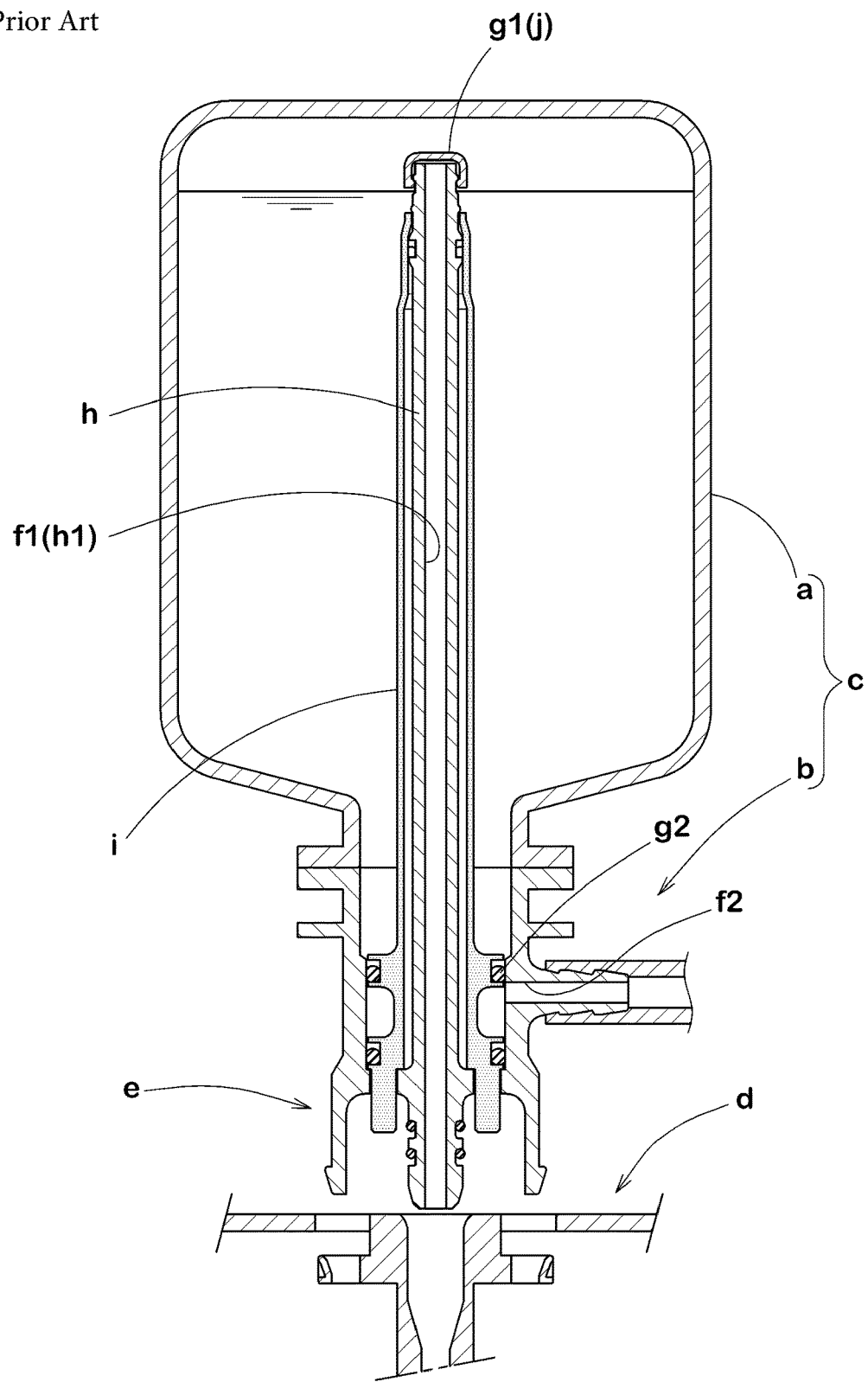
FIG. 12 is a cross-sectional view illustrating a conventional bottle unit for puncture repair kit.
Figure 13B:
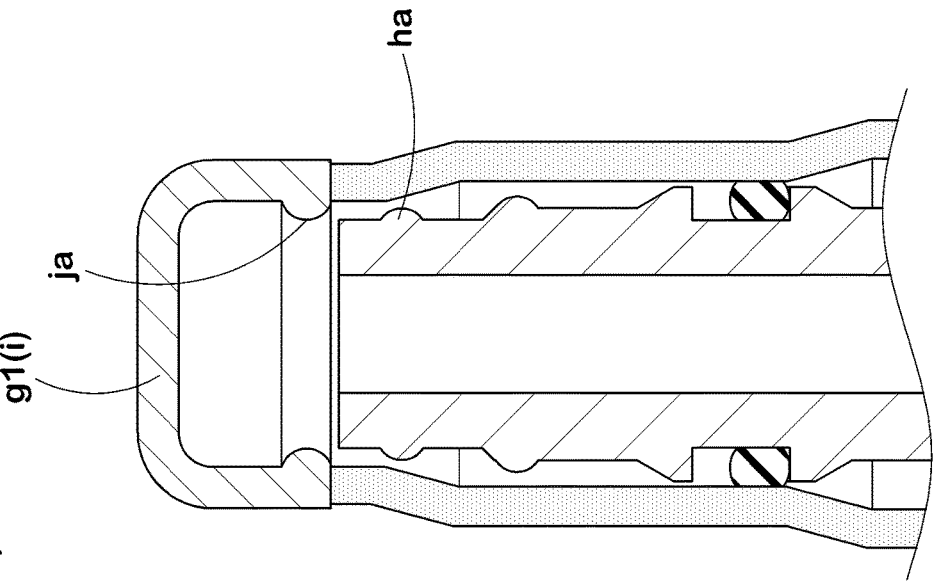
FIGS. 13A and 13B are partial cross-sectional views illustrating a process where the inner lid is being removed from the blast pipe by the sheath pipe.
Figure 13A:
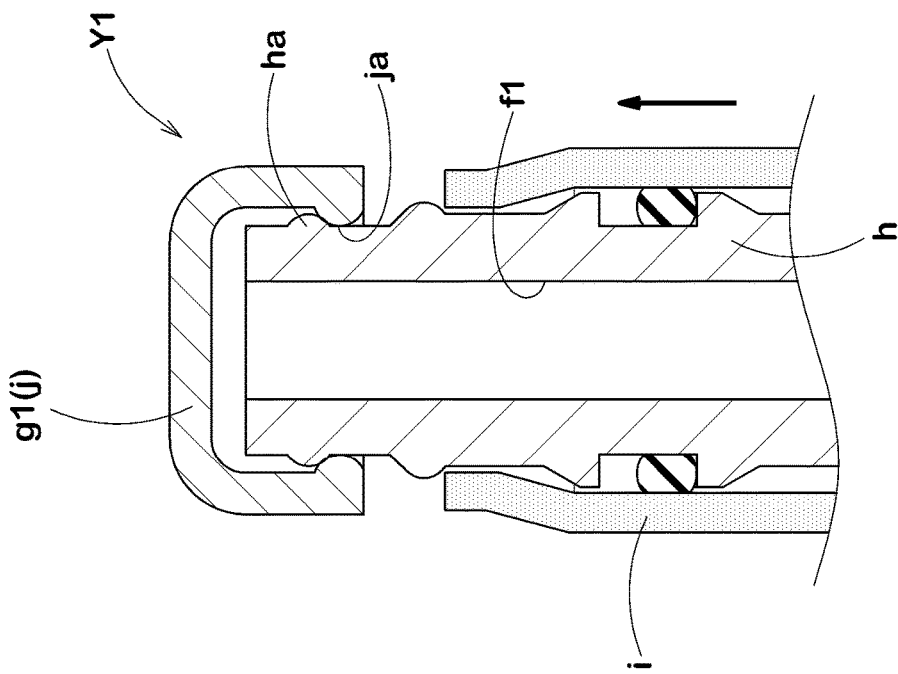

In also the second invention, as illustrated in FIGS. 11A and 11B, the upper end 17E of the blast pipe 17 is provided with the first locking projection 33 protruding in a small height from the outer surface of the blast pipe 17. Furthermore, the inner lid 18 is provided with the second locking projection 34 that protrudes in a small height from the inner surface of the inner lid 18 to be able engages with the first locking projection 33. The first locking projection 33 is formed as an annular projection 33A extending continuously in the circumferential direction. In the present embodiment, the second locking projection 34, in the same manner as the first invention, is formed as a plurality of locking projections 34A which is arranged in the circumferential direction apart from one another. Alternatively, in the second invention, the second locking projection 34 may be formed as an annular projection extending continuously in the circumferential direction.

In the second invention, the effect similar to a bottle opener is obtained by providing the push-up projection 56, and thus it is possible to take off the inner lid 18 easily with less force. Specifically, the contact area between the sheath pipe 15 and the inner lid 18, at the time of the pushed up action, is reduced. When the push-up force is the same, since the push-up pressure acting on the inner lid 18 may be increased according to reduction of the contact area, it is possible to deform a part of the inner lid 18. Conventionally, a large force was necessary to be greatly deformed the inner lid 18 as a whole (enlarged in diameter) when removing. On the other hand, in the second invention, since only a part of the inner lid 18 deforms when removing, the force same as the conventional one is not necessary. Through these effects, it is possible to remove the inner lid 18 easily with less push-up force, while preventing the inner lid 18 from being removed during storage. Note that as in this embodiment, when the second locking projection 34 is formed as a plurality of locking projections 34A, it is possible to remove the inner lid 18 more easily.

Preferably, the height H of the push-up projection 56 from the upper end surface 15S is in a range of from 1 to 10 mm. When it is less than 1 mm, it may be difficult to achieve the above-mentioned effect. Also, when the height is more than 10 mm, it may be difficult to achieve the above-mentioned effect. In addition, the push-up projection 56 may be damaged when pushing up due to lack of rigidity of the push-up projection 56. In view of the above, the lower limit of the height H is preferably equal to or more than 2 mm, and the upper limit is preferably equal to or less than 5 mm.

In the second invention, as illustrated in FIG. 8, the air inlet portion 10 of the extraction cap 5 may be configured to couple with the compressed air discharge port of the compressor 3 through the hose 41.

While the embodiments in accordance with the present invention have been described in detail, the present invention is not limited to the illustrated embodiments, but can be modified and carried out in various aspects.

EXAMPLE

To confirm effects of the first invention, the bottle units configured as illustrated in FIG. 1 were manufactured based on the detail shown in Table 1, and then removing performance of the inner lid of each sample was tested. Each of the samples of the bottle units has the same configuration except the configuration of the second locking projection provided on an inner surface of the inner lid. The common specification is as follows:

Height of first locking projection (annular projection) of blast pipe: 5.0 mm
Height of second locking projection of inner lid: 0.25 mm
Material of inner lid: low density polyethylene (LDPE), thickness of about 1.5 mm
Inner diameter of lid inner: ϕ11.0 mm
Test Method:

(A) Test at Room Temperature Environment:
After each bottle unit was stored for 24 hours at room temperature environment (25 degrees C.), it was immediately mounted to the compressor by pushing on. Then, pushing force at the time the inner lid comes off from the blast pipe (i.e., the push-up force of the sheath pipe) was measured.

(B) Test at Very Low Temperature Environment:
After each bottle unit was stored for 24 hours at very low temperature environment (−40 degrees C.), it was immediately mounted to the compressor by pushing on. Then, pushing force at the time the inner lid comes off from the blast pipe (i.e., the push-up force of the sheath pipe) was measured.

(C) Vibration Test:
While giving vibration to each bottle unit under the following conditions, a checker confirmed whether the inner lid comes off from the blast pipe or not by the naked eye. The test was conducted on both upright and lateral conditions of the bottle unit at environmental temperatures of 80 degrees C. and −45 degrees C. Then, the test result were indicated "Passed" when the inner lid was not removed and "Failed" when the inner lid was removed.

Frequency: 11 Hz
Amplitude level: 59.8 m/s$^2$
Vibration time: 25.3 hours

TABLE 1

|  | Ref. 1 | Ref. 2 | Ex. A1 | Ex. A2 | Ex. A3 | Ex. A4 | Ex. A5 | Ex. A6 |
| --- | --- | --- | --- | --- | --- | --- | --- | --- |
| Second locking projection | Presence (annular projection) | None | Presence | Presence | Presence | Presence | Presence | Presence |
| Number of locking projection | — | 0 | 2 | 2 | 2 | 4 | 4 | 4 |
| Angle of locking projection θ (deg.) | 360 | 0 | 5 | 45 | 50 | 5 | 45 | 50 |
| Push-up force (kgf) |  |  |  |  |  |  |  |  |
| At room temperature | 9.3 | 0.1 | 1 | 4 | 6.9 | 2 | 5.8 | 8.6 |
| At very low temperature | 44.8 | 0.2 | 5 | 20 | 30 | 15 | 35 | 40 |
| Vibration test | Passed | Failed | Passed | Passed | Passed | Passed | Passed | Passed |

As shown in Table 1, it is confirmed that the samples according to the first invention were able to remove the inner lid with less pushing force (i.e., a push-up force by the sheath pipe) while preventing removing due to vibration at both room temperature (25 degrees C.) and very low temperature (−40 degrees C.) environments.

To confirm effects of the second invention, the bottle units configured as illustrated in FIG. 9 were manufactured based on the detail shown in Table 2, and then removing performance of the inner lid of each sample was tested. Each of the samples of the bottle units has the same configuration except the configuration of the push-up projection provided on the upper end of the sheath pipe. The common specification is as follows:

Height of first locking projection (annular projection) of blast pipe: 5.0 mm
Height of second locking projection (annular projection) of inner lid: 0.25 mm
Material of inner lid: low density polyethylene (LDPE), thickness of about 1.5 mm
Inner diameter of lid inner: ϕ11.0 mm
The test method is the same as the above.

TABLE 2

|  | Ref. 1 | Ex. B1 | Ex. B2 | Ex. B3 | Ex. B4 | Ex. B5 | Ex. B6 | Ex. B7 | Ex. B8 | Ex. B9 |
| --- | --- | --- | --- | --- | --- | --- | --- | --- | --- | --- |
| Push-up projection |  |  |  |  |  |  |  |  |  |  |
| Projection height H (mm) | 0 | 1 | 2 | 3 | 5 | 10 | 11 | 5 | 5 | 5 |
| Angle θ (deg.) | — | 60 | 60 | 60 | 60 | 60 | 60 | 45 | 90 | 120 |
| Push-up force (kgf) |  |  |  |  |  |  |  |  |  |  |
| At room temperature | 8.9 | 6.3 | 4.3 | 4 | 4 | 3 | 3 | 4 | 4.2 | 4.3 |
| At very low temperature | 42.7 | 35.1 | 22 | 14.7 | 13.9 | 10.9 | 11 | 13.5 | 15 | 22.2 |

As shown in Table 2, it is confirmed that the samples according to the second invention were able to remove the inner lid with less pushing force (i.e., a push-up force by the sheath pipe) while preventing removing due to vibration at both room temperature (25 degrees C.) and very low temperature (−40 degrees C.) environments.

REFERENCE SIGNS LIST

1 Bottle unit
3 Compressor
4 Bottle container
4A Mouth portion
5 Extraction cap
7 Coupling means
8 First flow channel
9 Second flow channel
12 First closing means
13 Second closing means
14 Cap man body
15 Sheath pipe
15S Upper end surface
16 Barrel portion
16H Inner hole
16A Tubular portion
16B Bottom
17 Blast pipe
18 Inner lid
17H Central bore
33 First locking projection
33A Annular projection
34 Second locking projection
34A Locking projection
51A First ratchet tooth
51B Second ratchet tooth
55 One-way valve
56 Push-up projection
T Puncture repair liquid

The invention claimed is:

1. A bottle unit for puncture repair comprising:
a bottle container containing a puncture repair liquid; and
an extraction cap being attached to a mouth portion of the bottle container, the extraction cap comprising:
  a coupler for coupling the extraction cap and a compressor to be secured to each other,
  a first flow channel for taking in a compressed air from the compressor into the bottle container,
  a second flow channel for extracting the puncture repair liquid and the compressed air sequentially from the bottle container by an intake compressed air, and
  a first closure and a second closure for respectively closing the first flow channel and the second flow channel in a pre-coupling state attained by the coupler,
the extraction cap further comprising a cap main body and a sheath pipe, the cap main body comprising:
  a barrel portion comprising an upper end connected to the mouth portion of the bottle container,
  a lower end closed by a bottom,
  a tubular portion between the upper end and the lower end having an inner hole communicated with an inside of the bottle container, and
  a blast pipe extending upwardly from the bottom concentrically with the tubular portion and comprising a central bore to form the first flow channel,
the sheath pipe being held vertically in a slidable manner by the blast pipe, wherein the sheath pipe is pushed up upon connection of the coupler,
the first closure comprising an inner lid detachably attached to an upper end of the blast pipe to close the first flow channel so that the inner lid is detached from the blast pipe to open the first flow channel when the inner lid is pushed up by the sheath pipe,
the blast pipe comprising a first locking projection configured to an annular projection that protrudes in a small height from an outer surface of the blast pipe and extends continuously in a circumferential direction, and
the inner lid comprising a second locking projection that protrudes in a small height from an inner surface of the inner lid and engages with the first locking projection,
wherein the second locking projection comprises a plurality of locking-projections arranged in the circumferential direction apart from one another,
wherein the upper end of the blast pipe is located downward of a liquid surface of the puncture repair liquid,
wherein the first flow channel is provided with a one-way valve to prevent back-flow of the puncture repair liquid from the bottle container,
wherein the mouth portion of the bottle container is screwed into the inner hole of the cap main body,
wherein the mouth portion is provided with a first ratchet tooth, and
wherein the inner hole is provided with a second ratchet tooth that engages with the first ratchet tooth in only a rotational direction of loosening the screwed mouth portion.

2. The bottle unit for puncture repair according to claim 1, wherein each of the locking-projections has a circumferential length corresponding to a central angle around a center point of the inner lid of from 5 to 45 degrees.

3. A bottle unit for puncture repair comprising:
a bottle container containing a puncture repair liquid; and
an extraction cap being attached to a mouth portion of the bottle container, the extraction cap comprising:
  a coupler for coupling the extraction cap and a compressor to be secured to each other,
  a first flow channel for taking in a compressed air from the compressor into the bottle container,
  a second flow channel for extracting the puncture repair liquid and the compressed air sequentially from the bottle container by an intake compressed air, and
  a first closure and a second closure for respectively closing the first flow channel and the second flow channel in a pre-coupling state attained by the coupler,
the extraction cap further comprising a cap main body and a sheath pipe, the cap main body comprising:
  a barrel portion comprising an upper end connected to the mouth portion of the bottle container,
  a lower end closed by a bottom,
  a tubular portion between the upper end and the lower end having an inner hole communicated with an inside of the bottle container, and
  a blast pipe extending upwardly from the bottom concentrically with the tubular portion and comprising a central bore to form the first flow channel,
the sheath pipe being held by the blast pipe vertically in slidable manner, wherein the sheath pipe is pushed up upon connection of the coupler,
the first closure comprising an inner lid detachably attached to an upper end of the blast pipe to close the first flow channel so that the inner lid is detached from the blast pipe to open the first flow channel when the inner lid is pushed up by the sheath pipe, the blast pipe comprising a first locking projection configured to an annular projection that protrudes in a small height from an outer surface of the blast pipe and extends continuously in a circumferential direction, and the sheath pipe comprising a push-up projection on an upper end surface.

4. The bottle unit for puncture repair according to claim 3, wherein the push-up projection has a height in a range of from 1 to 10 mm from the upper end.

5. The bottle unit for puncture repair according to claim 3, wherein the push-up projection is formed in a central angle of equal to or less than 90 degrees around a center point of the sheath pipe.

6. The bottle unit for puncture repair according to claim 3, wherein the blast pipe comprises a first locking projection configured as an annular projection that protrudes in a small height from an outer surface of the blast pipe and extends continuously in a circumferential direction, wherein the inner lid comprises a second locking projection that protrudes in a small height from an inner surface of the inner lid and engages with the first locking projection, and wherein the second locking projection comprises a plurality of locking-projections arranged in the circumferential direction apart from one another.

7. The bottle unit for puncture repair according to claim 3, wherein the mouth portion of the bottle container is screwed into the inner hole of the cap main body, wherein the mouth portion is provided with a first ratchet tooth, and wherein the inner hole is provided with a second ratchet tooth that engages with the first ratchet tooth in only a rotational direction of loosening the screwed mouth portion.

8. The bottle unit for puncture repair according to claim 3, wherein the upper end of the blast pipe is located downward of a liquid surface of the puncture repair liquid, and wherein the first flow channel is provided with a one-way valve to prevent back-flow of the puncture repair liquid from the bottle container.

9. The bottle unit for puncture repair according to claim 4, wherein the push-up projection is formed in a central angle of equal to or less than 90 degrees around a center point of the sheath pipe.

10. The bottle unit for puncture repair according to claim 4, wherein the blast pipe comprises a first locking projection configured to an annular projection that protrudes in a small height from an outer surface of the blast pipe and extends continuously in a circumferential direction, wherein the inner lid comprises a second locking projection that protrudes in a small height from an inner surface of the inner lid and engages with the first locking projection, and wherein the second locking projection comprises a plurality of locking-projections arranged in the circumferential direction apart from one another.

11. The bottle unit for puncture repair according to claim 5, wherein the blast pipe comprises a first locking projection configured to an annular projection that protrudes in a small height from an outer surface of the blast pipe and extends continuously in a circumferential direction, wherein the inner lid comprises a second locking projection that protrudes in a small height from an inner surface of the inner lid and engages with the first locking projection, and wherein the second locking projection comprises a plurality of locking-projections arranged in the circumferential direction apart from one another.

12. The bottle unit for puncture repair according to claim 4, wherein the mouth portion of the bottle container is screwed into the inner hole of the cap main body, wherein the mouth portion is provided with a first ratchet tooth, and wherein the inner hole is provided with a second ratchet tooth that engages with the first ratchet tooth in only a rotational direction of loosening the screwed mouth portion.

13. The bottle unit for puncture repair according to claim 5, wherein the mouth portion of the bottle container is screwed into the inner hole of the cap main body, wherein the mouth portion is provided with a first ratchet tooth, and wherein the inner hole is provided with a second ratchet tooth that engages with the first ratchet tooth in only a rotational direction of loosening the screwed mouth portion.

14. The bottle unit for puncture repair according to claim 6, wherein the mouth portion of the bottle container is screwed into the inner hole of the cap main body, wherein the mouth portion is provided with a first ratchet tooth, and wherein the inner hole is provided with a second ratchet tooth that engages with the first ratchet tooth in only a rotational direction of loosening the screwed mouth portion.

15. The bottle unit for puncture repair according to claim 4, wherein the upper end of the blast pipe is located downward of a liquid surface of the puncture repair liquid, and wherein the first flow channel is provided with a one-way valve to prevent back-flow of the puncture repair liquid from the bottle container.

* * * * *